United States Patent
Reeb

(10) Patent No.: US 12,500,258 B2
(45) Date of Patent: Dec. 16, 2025

(54) METHOD FOR PRODUCTION AND PROCESSING OF A FRAMED PROTON-CONDUCTING MEMBRANE

(71) Applicant: Audi AG, Ingolstadt (DE)

(72) Inventor: Berthold Reeb, Ellwangen-Hochgreut (DE)

(73) Assignee: AUDI AG, Ingolstadt (DE)

( * ) Notice: Subject to any disclaimer, the term of this patent is extended or adjusted under 35 U.S.C. 154(b) by 384 days.

(21) Appl. No.: 18/005,487

(22) PCT Filed: Oct. 22, 2021

(86) PCT No.: PCT/EP2021/079333
§ 371 (c)(1),
(2) Date: Jan. 13, 2023

(87) PCT Pub. No.: WO2022/090077
PCT Pub. Date: May 5, 2022

(65) Prior Publication Data
US 2023/0253597 A1    Aug. 10, 2023

(30) Foreign Application Priority Data
Oct. 26, 2020  (DE) .................. 10 2020 128 105.6

(51) Int. Cl.
*H01M 8/1086* (2016.01)
*H01M 8/10* (2016.01)

(52) U.S. Cl.
CPC ......... *H01M 8/1093* (2013.01); *H01M 8/109* (2013.01); *H01M 2008/1095* (2013.01)

(58) Field of Classification Search
CPC .. H01M 8/1093; H01M 8/1086; H01M 8/109; H01M 8/1076; H01M 8/1058; H01M 8/1041; H01M 8/1004; H01M 2008/1095
See application file for complete search history.

(56) References Cited

U.S. PATENT DOCUMENTS

| | | | |
|---|---|---|---|
| 7,488,547 B1* | 2/2009 | Iacovelli | H01M 8/083 429/434 |
| 2011/0281195 A1 | 11/2011 | Fuller et al. | |
| 2013/0177823 A1* | 7/2013 | Nguyen | H01M 8/065 123/3 |
| 2015/0099208 A1* | 4/2015 | Sugiura | H01M 4/8626 429/481 |
| 2018/0163869 A1 | 6/2018 | Saso et al. | |
| 2018/0241054 A1 | 8/2018 | Bihlmaier et al. | |

FOREIGN PATENT DOCUMENTS

| | | |
|---|---|---|
| CA | 2940458 A1 | 9/2015 |
| CN | 1329642 A | 1/2002 |
| CN | 107851818 A | 3/2018 |
| CN | 110400944 A | 11/2019 |
| JP | 2016225274 A | 12/2016 |
| JP | 2017107645 A | 6/2017 |
| JP | 2020135945 A | 8/2020 |
| WO | WO 2017025171 A1 | 2/2017 |

OTHER PUBLICATIONS

Written Opinion of the International Searching Authority, mailed Mar. 31, 2022, for International Patent Application No. PCT/EP2021/079333. (6 pages).

* cited by examiner

*Primary Examiner* — Raymond Alejandro
(74) *Attorney, Agent, or Firm* — Seed Intellectual Property Law Group LLP

(57) ABSTRACT

A method for production and processing of a framed proton-conducting membrane for a fuel cell, comprises: providing of the proton-conducting membrane and a frame comprising at least two media ports inserting the membrane into a recess of the frame, processing of at least one surface of the frame such that a first region exists with an increased force of adhesion for a joining by means of gluing, and at least one second region exists with a lesser force of adhesion than the increased force of adhesion.

10 Claims, 1 Drawing Sheet

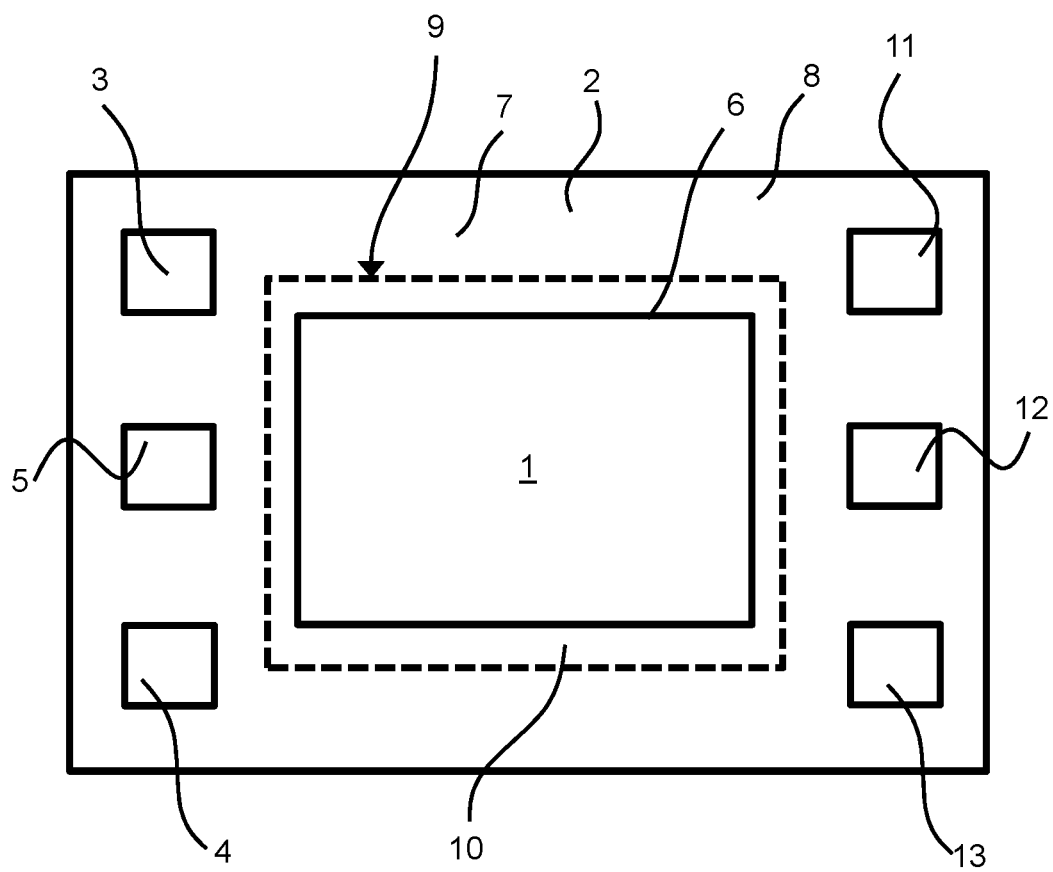

METHOD FOR PRODUCTION AND PROCESSING OF A FRAMED PROTON-CONDUCTING MEMBRANE

TECHNICAL FIELD

Embodiments of the invention relate to a method for production and processing of a framed proton-conducting membrane for a fuel cell.

DESCRIPTION OF THE RELATED ART

Fuel cell devices are used for the chemical transformation of a fuel with oxygen to form water in order to create electric energy. For this, fuel cells contain as their key component a proton-conducting (electrolyte) membrane. These may be associated with electrodes, so that the proton-conducting membrane forms with the electrodes a common membrane electrode assembly (MEA). Alternatively, the electrodes may also be associated with gas diffusion layers arranged adjacent to the proton-conducting membrane.

In operation of a fuel cell device having a plurality of fuel cells assembled into a fuel cell stack, the fuel, especially hydrogen $H_2$ or a gas mixture containing hydrogen, is supplied to the anode. In the case of a mixture containing hydrogen, this is first reformed and thus hydrogen is provided. At the anode, an electrochemical oxidation of $H_2$ to $H^+$ takes place, giving off electrons. The electrons provided at the anode are taken by an electrical line to the cathode. The cathode is supplied with oxygen or a gas mixture containing oxygen, so that a reduction of $O_2$ $O^{2-}$ occurs, 20 taking up electrons.

It is known how to join the proton-conducting membrane with the components of the fuel cell in discrete, that is, individual steps to form an assemblage, while the element joining the components may be formed of an adhesive in the form of a liquid glue. The problem in this case is that the glue prior to hardening can migrate into the active surface of the proton-conducting membrane and partially deactivate it.

In US 2011 281 195 A1 there is described a method for the production of a membrane electrode assembly in which a glue is used that cannot migrate beyond a marginal region of an active surface of the fuel cell on account of its high force of adhesion.

BRIEF SUMMARY

Some embodiments provide an alternative method for the production and processing of a proton-conducting membrane in which a migrating of the glue into the proton-conducting membrane is prevented or reduced.

The method for production and processing of a framed proton-conducting membrane for a fuel cell may include:
  providing of the proton-conducting membrane and a frame comprising at least two media ports,
  inserting the membrane into a recess of the frame,
  processing of at least one surface of the frame such that a first region exists with an increased force of adhesion for a joining by means of gluing, and at least one second region exists with a lesser force of adhesion than the increased force of adhesion.

Thanks to the processing of the at least one surface of the frame, a first region with an increased force of adhesion is created, making possible a secure adhering of the proton-conducting membrane to an adjacent layer, for example an electrode or a gas diffusion layer. At the same time, a second region is created which has a lesser force of adhesion than that of the first region. This prevents or impedes the adhering of a glue within the second region and thus the migration of the glue into the proton-conducting membrane. Degradation mechanisms can thus be reduced, such as an ionic deactivation of the proton conductivity or a wetting of the precious metal catalysts on a proton-conducting membrane which is coated with a catalyst. The at least two media ports serve here for the supplying of the reactants, i.e., oxygen and fuel. In addition, a third media port can also be provided for the supply of cooling water. Furthermore, additional media ports can also be provided for taking away the reactants and the cooling water.

Furthermore, it may be advantageous for the second region to be bounded by a closed line extending between the media ports and the recess of the frame. This enables a relatively large first region with increased force of adhesion, so that a good and secure adhering of the proton-conducting membrane to an adjacent layer is possible.

Furthermore, it may be advantageous for the second region to extend up to the recess. In this way, a relatively large second region with lesser force of adhesion is provided. This serves as a barrier for the proton-conducting membrane, to prevent the glue from penetrating into it. In this regard, it is advisable for the surface of the second region to be smaller than the surface of the first region, in order to assure a secure adhering of the proton-conducting membrane to an adjacent layer.

In order to increase the force of adhesion of the first region, it may be advantageous for the at least one region of the frame to be processed by means of plasma irradiation and thus activated.

Alternatively or additionally, it is possible for the at least one region of the frame to be processed with electromagnetic radiation, especially with light. It may be advantageous for the at least one surface of the frame to be irradiated with UV light or with IR radiation. This may be advantageous when using UV-curing glues or hot melt glues, among others.

In order to generate a second region with a lesser force of adhesion, the second region may be covered by means of a mask before the processing of the at least one surface of the frame is done. This prevents the second region from also being processed during an adhesion-increasing processing, such as a plasma irradiation or the irradiation with electromagnetic radiation. The second region is shielded from the irradiation and thus excluded from it. Thus, an adhesion-increasing action on the second region is prevented by the mask.

Alternatively or additionally, it may be advantageous for the irradiation of the at least one surface of the frame to be done by means of a radiation source comprising a slit system or a mask, so that the second region is left out or shielded from the irradiation by the radiation source. The radiation source can be a plasma source or a light source, on which a slit system is formed or in front of which a mask is arranged. In other words, the slit system can comprise one or more slits which are coupled into the beam path of the radiation source.

Alternatively or additionally, it is also possible to apply a dewetting agent to the surface of the second region, at least in one area, before or during the processing of the at least one surface of the frame. This dewetting agent has the effect that the wetting angle of the surface so treated of the second region is greater than 90°, so that the force of adhesion of the second region is actively decreased.

In particular, it may be advantageous for the dewetting agent to be based on a silicone, such as a silicone oil.

Alternatively or additionally, it may also be advantageous for the processing of the at least one surface of the frame to be done by heating. Thus, an increased force of adhesion can be achieved after applying a glue for gluing the proton-conducting membrane to an adjacent layer by heating the glue.

BRIEF DESCRIPTION OF THE SEVERAL VIEWS OF THE DRAWINGS

Further benefits, features and details will emerge from the claims, the following description of embodiments, and the drawings.

FIG. 1 shows a schematic top view of a framed proton-conducting membrane or a CCM.

DETAILED DESCRIPTION

FIG. 1 shows a proton-conducting membrane 1 for a fuel cell inserted into a recess 6 of a frame 2. As a semipermeable electrolyte membrane, this can be covered on a first side with an anode and on a second side with a cathode and be connected firmly to these. The electrodes and the membrane 1 then form a composite of a so-called membrane electrode assembly (MEA). The first electrode and the second electrode comprise substrate particles, on which are arranged catalyst particles of precious metals or mixtures containing precious metals such as platinum, palladium, ruthenium or the like. These catalyst particles serve as reaction accelerators in the electrochemical reaction of the fuel cell. The substrate particles may contain carbon. However, substrate particles formed from a metal oxide or carbon with an appropriate coating may also be considered. The electrodes may be formed with a multitude of catalyst particles, which can be formed as nanoparticles, such as core-shell nanoparticles. They have the advantage of a large surface, with the precious metal or the precious metal alloy arranged only on the surface, while a less valuable metal, such as nickel or copper, forms the core of the nanoparticle. In such a polymer electrolyte membrane fuel cell (PEM fuel cell), fuel or fuel molecules, especially hydrogen, are split up into protons and electrons at the first electrode (anode). The proton-conducting membrane 1 lets through the protons (such as $H^+$), but is impenetrable to the electrons ($e^-$). The proton-conducting membrane 1 in this embodiment is formed from an ionomer, such as a sulfonated tetrafluorethylene polymer (PTFE) or a polymer of perfluorinated sulfonic acid (PFSA). At the anode the following reaction occurs: $2H_2 \rightarrow 4H^+ + 4e^-$ (oxidation/electron surrender). While the protons pass through the proton-conducting membrane 1 to the second electrode (cathode), the electrons are taken by an external circuit to the cathode or to an energy accumulator. A cathode gas, especially oxygen or air containing oxygen, is provided to the cathode, so that the following reaction occurs here: $O_2 + 4H^+ + 4e^- \rightarrow 2H_2O$ (reduction/electron uptake).

In the present case, the frame 2 comprises multiple media ports 3, 4, 5, 11, 12, 13 for supplying and taking away the reactants, i.e., the fuel and oxygen, and for supplying and taking away coolant.

The method for the production and processing of the proton-conducting membrane 1 encompasses the following steps: first of all, the proton-conducting membrane 1 is provided and inserted into the recess 6 of the frame 2 having at least two media ports 3, 4, 5, 11, 12, 13. In order to join the proton-conducting membrane 1 to an adjacent layer, i.e., for example an electrode or a gas diffusion layer, by means of gluing, a surface 7 of the frame 2 is processed so that a first region 8 exists with an increased force of adhesion and a second region 9 exists with a force of adhesion which is decreased as compared to the increased force of adhesion of the first region 8.

The presence of a first region 8 with increased force of adhesion enables a better adherence between two layers being glued together. At the same time, the second region 9 having a lesser force of adhesion prevents a migration of the glue into the active region of the proton-conducting membrane 1 and thus a damaging of it by the glue.

The second region 9 may be a line running between the media ports 3, 4, 5, 11, 12, 13 and the recess 6 of the frame 2, being represented in FIG. 1 as dashed line. But in order to increase the barrier effect it is also possible for the second region 9 to extend from the line running between the media ports 3, 4, 5, 11, 12 ,13 and the recess 6 to the recess 6.

The adhesion-increasing processing may be done by a plasma irradiation of the at least one surface 7. Alternatively or additionally, the at least one surface 7 can also be processed with an electromagnetic radiation, such as a UV radiation or IR radiation, or by heating the at least one surface 7.

In order to form a second region 9 in which the force of adhesion is less than in the first region 8, despite the adhesion-increasing processing, it is possible on the one hand to leave out the second region 9 during the irradiation, or on the other hand to subject the second region 9 to an adhesion-decreasing processing. This will electrostatically prevent a migration of the glue into proton-conducting membrane 1.

The first alternative can be achieved by covering the second region 9 by means of a mask before the processing of the at least one surface 7 of the frame 2 occurs, i.e., before the plasma treatment or before the irradiation. Consequently, the mask shields the second region 9 from the treatment or irradiation, so that an adhesion-increasing effect on the second region 9 is prevented. Thus, only the unshielded first region 8 is exposed to the adhesion-increasing treatment.

Alternatively, this effect can also be achieved in that the radiation source used for the treatment or irradiation has a slit system or a mask, such that the second region 9 is left out of the irradiation or treatment by the radiation source. In other words, one or more slits or a mask are coupled into the beam path of the radiation source.

The adhesion-decreasing processing on the other hand can be achieved by applying a dewetting agent at least partially to the surface 10 of the second region 9. This can be, for example, a silicone-containing material, such as a silicone oil. This results in the wetting angle on the surface of the second region 9 becoming greater than 90° and thus the force of adhesion is actively reduced.

The processing of the at least one surface 7 of the frame can involve in one embodiment both an adhesion-decreasing processing on the surface 10 of the second region and an adhesion-increasing processing of the surface 7 of the first region 9. Alternatively, the processing can also be only an adhesion-increasing processing, leaving out the second region 9, or also only an adhesion-decreasing processing of the second region 9, leaving out the first region 8.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for production and processing of a framed proton-conducting membrane for a fuel cell, comprising:
   providing of the proton-conducting membrane and a frame comprising at least two media ports;
   inserting the membrane into a recess of the frame; and
   processing of at least one surface of the frame such that a first region exists with an increased force of adhesion for a joining by gluing, and at least one second region exists with a lesser force of adhesion than the increased force of adhesion.

2. The method according to claim 1, wherein the second region is bounded by a closed line extending between the media ports and the recess of the frame.

3. The method according to claim 2, wherein the second region extends up to the recess.

4. The method according to claim 1, wherein the at least one region of the frame is processed by means of plasma irradiation.

5. The method according to claim 1, wherein the at least one region of the frame is processed with electromagnetic radiation.

6. The method according to claim 1, wherein the second region is covered by means of a mask before the processing of the at least one surface of the frame is done.

7. The method according to claim 4, wherein the irradiation of the at least one surface of the frame is done by means of a radiation source comprising a slit system or a mask, and the second region is left out from the irradiation by the radiation source.

8. The method according to claim 1, wherein before or during the processing of the at least one surface of the frame there is applied a dewetting agent to the surface of the second region, at least in one area, so that the wetting angle on the surface of the second region is greater than 90°.

9. The method according to claim 8, wherein the dewetting agent is based on a silicone.

10. The method according to claim 1, wherein the processing of the at least one surface of the frame is done by heating.

* * * * *